H. HEUSER.
MANUFACTURE OF DRY EXTRACTS OF BEER, &c.
APPLICATION FILED DEC. 20, 1916.
1,228,917.
Patented June 5, 1917.
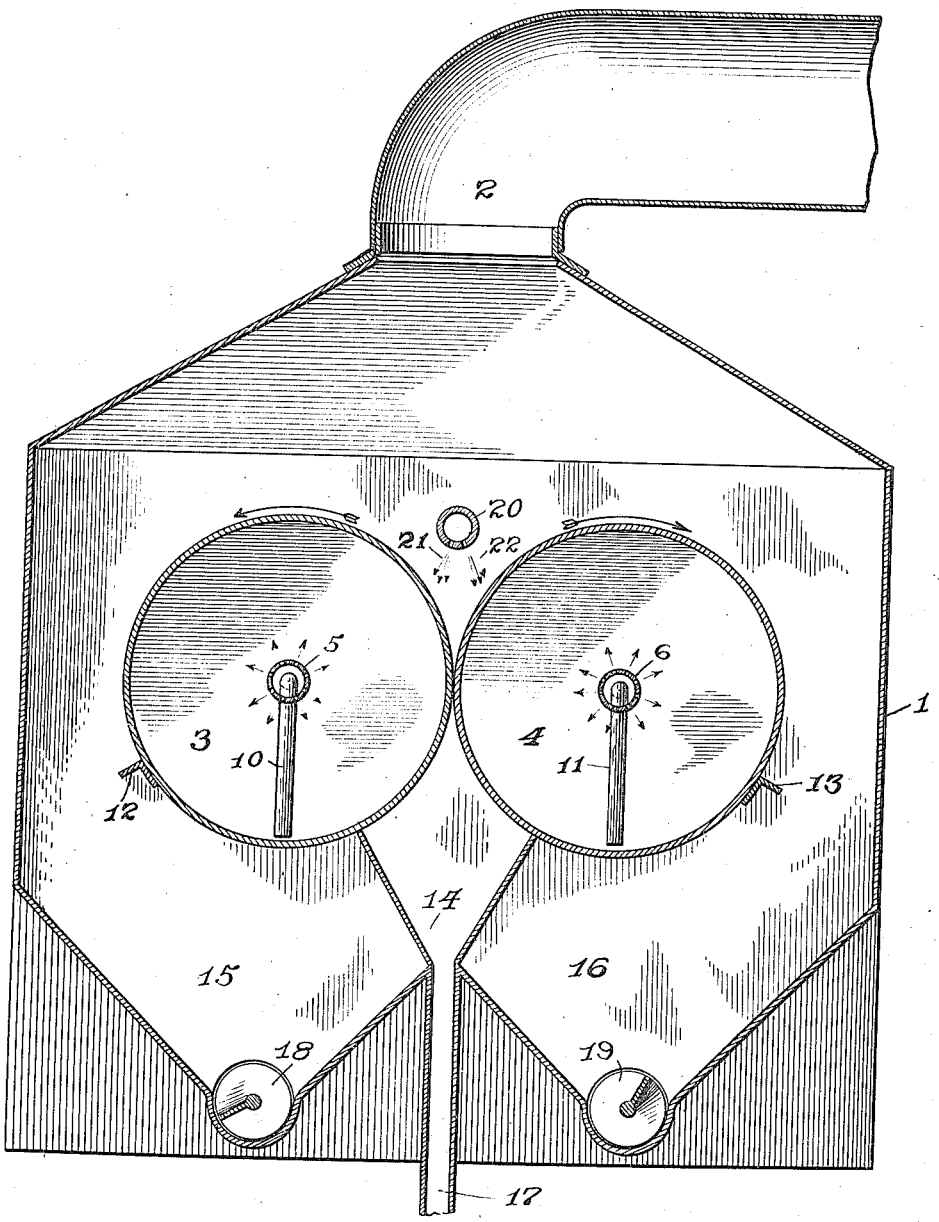

UNITED STATES PATENT OFFICE.

HERMAN HEUSER, OF CHICAGO, ILLINOIS.

MANUFACTURE OF DRY EXTRACTS OF BEER, &c.

1,228,917.　　　　Specification of Letters Patent.　　Patented June 5, 1917.

Application filed December 20, 1916. Serial No. 137,960.

*To all whom it may concern:*

Be it known that I, HERMAN HEUSER, a citizen of the United States, residing at Chicago, in the county of Cook and State of Illinois, have invented certain new and useful Improvements in the Manufacture of Dry Extracts of Beer, &c., of which the following is a specification.

My invention relates to the manufacture of extracts from beer or other fermented beverages, and its object is to provide a desiccated dry compound containing extract of any such suitable beverage, yeast in active condition and only sufficient fermentable substances to produce in the beverage made by properly water-diluting such compound the desired reduced amount of alcohol by yeast-fermentation. Thus, when such extracts are intended for conversion into beverages of low-alcoholic strength, the amount of added fermentable substances is small, and vice versa it is larger for the manufacture of beverages having higher alcoholic content, but in each case the compound contains yeast in live condition to create fermentation in the dilute beverage to produce the desired reduced amount of alcohol.

The accompanying drawing shows more or less diagrammatically and partly in sectional view the features of an apparatus to carry out the desiccation of the original beverage. In the drawing the reference numeral 1 indicates a vacuum evaporating chamber, its vapor pipe 2 leading to suitable vacuum-producing appliances not shown. In this chamber the steam-heated hollow rollers or drums 3 and 4 are rotatably mounted around the hollow shafts 5 and 6 respectively, and when in operation rotate oppositely in the direction of their arrows. The rollers receive their steam supply through the hollow shafts 5 and 6, and the products of condensation are discharged through suction pipes 10 and 11 each leading respectively from the lowest point in its associated roller and out through its shaft to a suction-producing device not shown. 12 and 13 are scrapers each acting upon one of the rollers 3 and 4. 14, 15 and 16 are receiving hoppers. The hopper 14 equipped with the barometrical discharge tube 17 is intended to catch the drippings of the beverage under evaporation which may pass between the rollers as the latter usually are not in contact. The hoppers 15 and 16 receive the solid or dry extract or residue removed from the rollers 3 and 4 by the scrapers 12 and 13, and each is provided at the bottom with a conveyer 18 suitably arranged for discharging the extract without disturbing the vacuum within. 20 is the beverage supply pipe with numerous fine perforations leading in the direction of the rollers as shown by the arrows 21 and 22.

A practical application of the typical operation of the above device for desiccating beverages will be apparent from the following description of its treatment of beer. While the chamber 1 is kept under a vacuum high enough for boiling evaporation to take place at a predetermined low temperature, say 100° Fahrenheit, ordinary beer (preferably clarified) passes out of pipe 20 in the form of minute sprays in the direction of the arrows 21 and 22 upon the rotating steam-heated rollers 3 and 4, the beer preferably being discharged upon the rollers in such quantities that it adheres to the same without causing any drippings, but in case of drippings they drop into receiver 14 from where they are carried off and discharged by the barometrical tube 17, being of course collected and worked over again. The beer spreads into a thin sheet adhering to the rollers and is rapidly desiccated by giving off vapors consisting principally of water and alcohol and containing $CO_2$ and the volatile flavor substances, which are continuously carried off through the vapor pipe 2 by a vacuum producing device not shown. The dry residue or extract of beer is removed from the rollers 3 and 4 by the scrapers 12 and 13, and drops into the hoppers 15 and 16 from where it is continuously discharged by the conveyers 18 from the vacuum chamber 1.

The beer residue or extract usually discharged in powder form is then mixed with dry yeast and dry fermentable carbohydrates or dry unfermented wort containing fermentable carbohydrates, which latter may be made in the same manner as the beer extract. For each 100 lbs. of dry wort extract about 6 pounds of dry yeast are mixed in. Also, it is obvious that beer and unfermented wort may be mixed with each other in proper proportion before they are desiccated or changed into solids, and in this case the residue left after evaporation requires only the mixing of the proper quantity of dry yeast to be ready for the market.

It is also obvious that beer, unfermented wort and yeast may be mixed with each other in the proper proportions and then such mixture may be desiccated. This last operation produces a completed product requiring no further mixing and therefore makes the use of a special mixing apparatus unnecessary; but when the yeast is mixed with the material under evaporation the vacuum should be kept so high that the evaporation takes place at temperatures that preserve the yeast in vigorous condition, say 80° Fahrenheit, and it is also advisable that an added mixture containing fermentable wort and yeast be kept at so low a temperature that it cannot ferment during the time that elapses while it passes into the vacuum chamber. When the yeast is mixed with the material under evaporation it may be added in any suitable form or manner, for example in crushed condition as in the form of Buchner's yeast-cell juice which when dried by the above process will preserve its various enzyms alive in the dry extract.

The proportions of fermentable carbohydrates and extract of beer or other fermented beverage under treatment or the amount of fermentable carbohydrates in the yeast-containing compounds depends upon the percentage of alcohol that is to be produced by fermentation in the final beverage with respect to its predetermined dilution. For example, if the percentage of alcohol by weight in the final beverage is to be 0.10 and the degree of dilution with water 15, the percentage of fermentable carbohydrates in the compound is $$2 \times 0.10 \times 15 = 3\%.$$

This calculation is based on the presumption that one pound of fermentable carbohydrates splits up by fermentation in equal parts by weight of $CO_2$ and alcohol, and this is sufficiently accurate for practical purposes. Thus the yeast-containing compound may produce various percentages of alcohol in the final beverage by regulating its amount of fermentable carbohydrates.

In producing my invention the evaporation is practically instantaneous, and fermentation is prevented during the evaporation; the fermented beverages and their respective solids or residues and the yeast are protected during evaporation by the low temperatures, and also by the character of the evaporation which does not occupy such a length of time as is required for any injury to take effect in the materials. This is advantageous as it obviates the objection to the ordinary practice of condensing or concentrating by evaporation *in vacuo* at low temperatures that the required long exposure to heat causes undesirable changes in the more valuable portions of the soluble constituents of the elements of fermentation, as for instance to the phosphates and albuminoids, which are largely converted back into insoluble compounds. In producing my invention the exposure of the materials to the heat is so short that it has no effect in this respect, and therefore the degree of solubility of the phosphates and albuminoids is preserved, and so they offer more nutriment to the yeast to increase its action in the ultimate beverages made by diluting the extracts with water, whereby the taste and flavor imparting property of the yeast is promoted in the final beverage. The preservation of the albuminoids and phosphates in soluble form also brightens the appearance of the ultimate beverage, and presents the more valuable constituents of the elements of fermentation in a greater quantity for human nutriment. The evaporation at yeast-preserving temperatures with a minimum of exposure to the heat also preserves the solubility of the enzyms of yeast, and therefore the yeast remains in active condition so it will act vigorously when an extract is diluted with water for the preparation of a beverage.

The dry compound formed by the extract of the chosen beverage, yeast in live condition and fermentable substances may be put up in any desired form, preferably in powdered or granular form, and is then packed preferably in sealed containers which shut out the air and light. When the extract is to be used it is mixed with water. A compound for producing low alcoholic strength in the ultimate beverage, as for example a compound for producing low-alcoholic beer, is mixed with water usually at the ratio of 1:15. The mixture is bottled and subjected to bottle fermentation, preferably in brown or dark colored bottles because they protect the yeast and the fermenting beverage against the detrimental effects of light. As in bottle-fermentation employed for making sparkling wines and champagne, the bottles are not filled up entirely, but an air space is left for $CO_2$ generated by subsequent fermentation, so that the final beverage has a sparkling or carbonated property. The bottles are corked and put in a cool place, preferably in the cellar. After fermentation the beer is ready for drinking.

The present invention can be successfully practised in connection with dry extracts of all kinds of fermented beverages known in the fermentation industry; for example, beers, fermented malted or unmalted grain beverages, fermented grape juice and wine, fermented fruit juices, etc. It presents to the dealer or user a completed product with which to prepare his own alcohol-reduced beverages without any care other than to add a stated amount of water and to bottle this ultimate mixture, without further addition or measuring of either yeast or fermentable substances to prepare a given quantity of beverage, without any skill in fermentation or its problems, and without the necessity of obtaining or keeping the proper kind of yeast required for the particular beverage intended to be made.

I claim:—

1. A compound for conversion into alcohol-reduced beverages by dilution with water containing dry extract of a fermented beverage, dry fermentable substances and dry live yeast.

2. A compound for conversion into alcohol-reduced beer by dilution with water containing dry beer-extract, dry fermentable substances and dry live yeast.

3. A compound for conversion into alcohol-reduced beer by dilution with water containing dry beer-extract, dry fermentable carbohydrates and dry live yeast.

In testimony whereof I affix my signature in presence of two witnesses.

HERMAN HEUSER.

Witnesses:
J. McRoberts,
W. W. Pontious.